United States Patent [19]

Miller et al.

[11] 3,719,244

[45] March 6, 1973

[54] RECREATIONAL VEHICLE

[75] Inventors: Hobart G. Miller; James F. Mariol, both of Chicago, Ill.

[73] Assignee: Apeco Corporation, Evanston, Ill.

[22] Filed: Oct. 7, 1971

[21] Appl. No.: 187,409

[52] U.S. Cl. ............... 180/14 R, 180/12, 296/23 MC
[51] Int. Cl. ............................................. B62d 53/04
[58] Field of Search ..................... 180/11, 12, 89; 296/23, 23 MC

[56] References Cited

UNITED STATES PATENTS 3,411,600   11/1968   Loving .............................. 180/12 X

FOREIGN PATENTS OR APPLICATIONS

M28558   9/1954   Germany .............................. 180/12

Primary Examiner—Gerald M. Forlenza
Assistant Examiner—George F. Abraham
Attorney—Wolfe, Hubbard, Leydig, Voit & Osann

[57] ABSTRACT

A recreational vehicle of composite construction made up of a power unit, or tractor, and a self-supporting living unit, the units being telescoped together and interfitted to form a single rigid structure for safe and easy driving at highway speeds. The power unit, in addition to a pair of steerable driving wheels, has a pair of auxiliary wheels which are normally retracted but which are extendible to permit the power unit to be separated for independent usage as a runabout when the living unit is parked in a camp site or the like. Means are provided for drawing the units together and for separating them so that conversion from one mode of use to the other can be effected in just a few seconds' time. The units are so joined and constructed that when drawn together, and with the auxiliary wheels retracted, the appearance is that of a vehicle having a single frame and body. The rear wall of the power unit and front wall of the living unit, upon assembly, lie closely face-to-face and have registering doorways to permit easy movement of the passengers back and forth between the units while underway.

22 Claims, 15 Drawing Figures

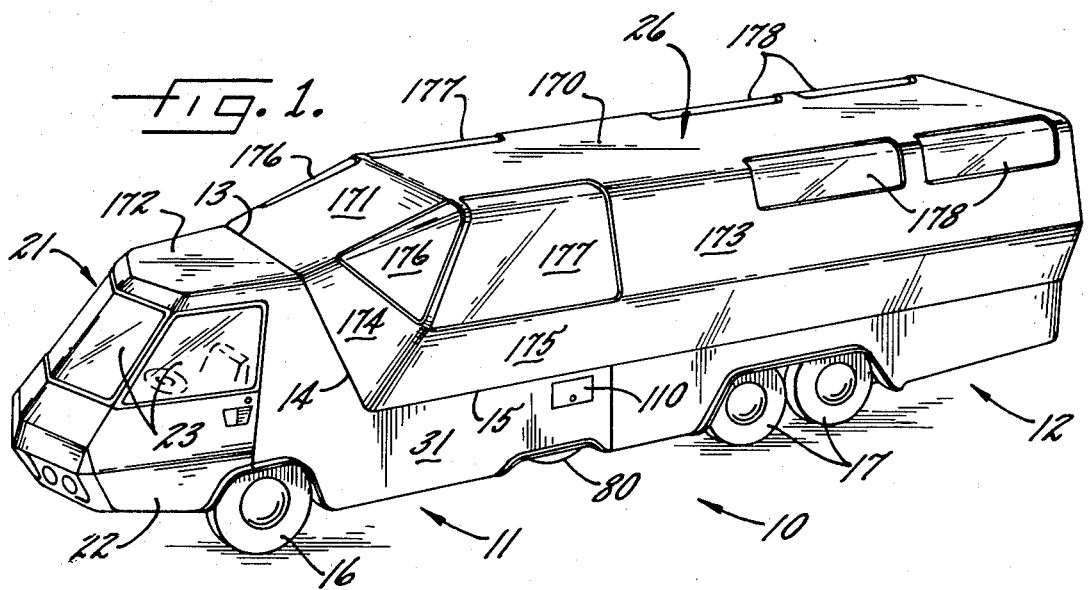
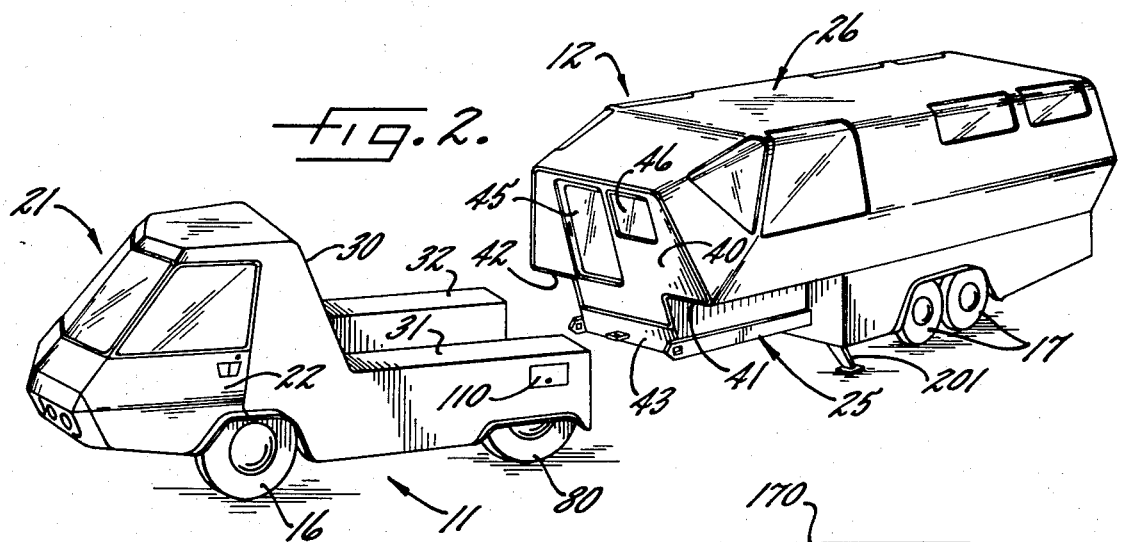
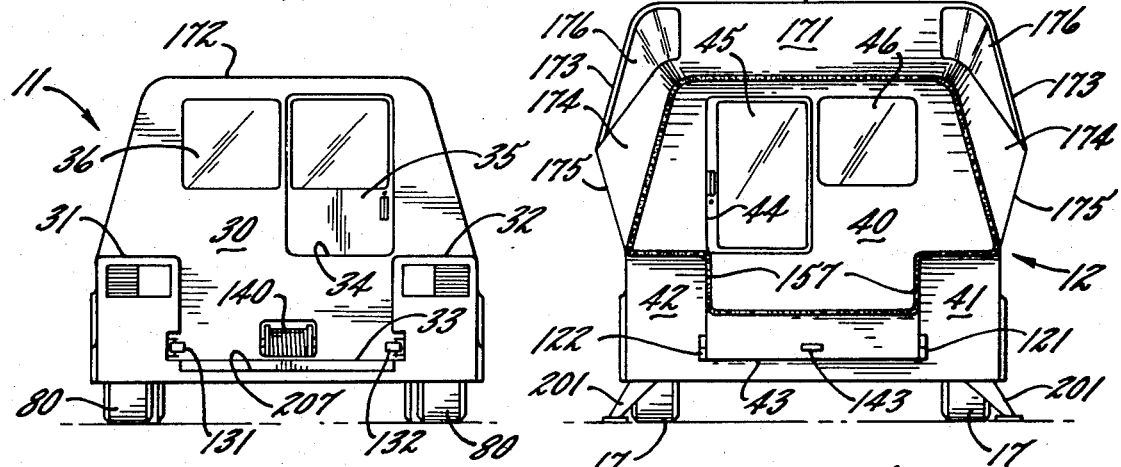

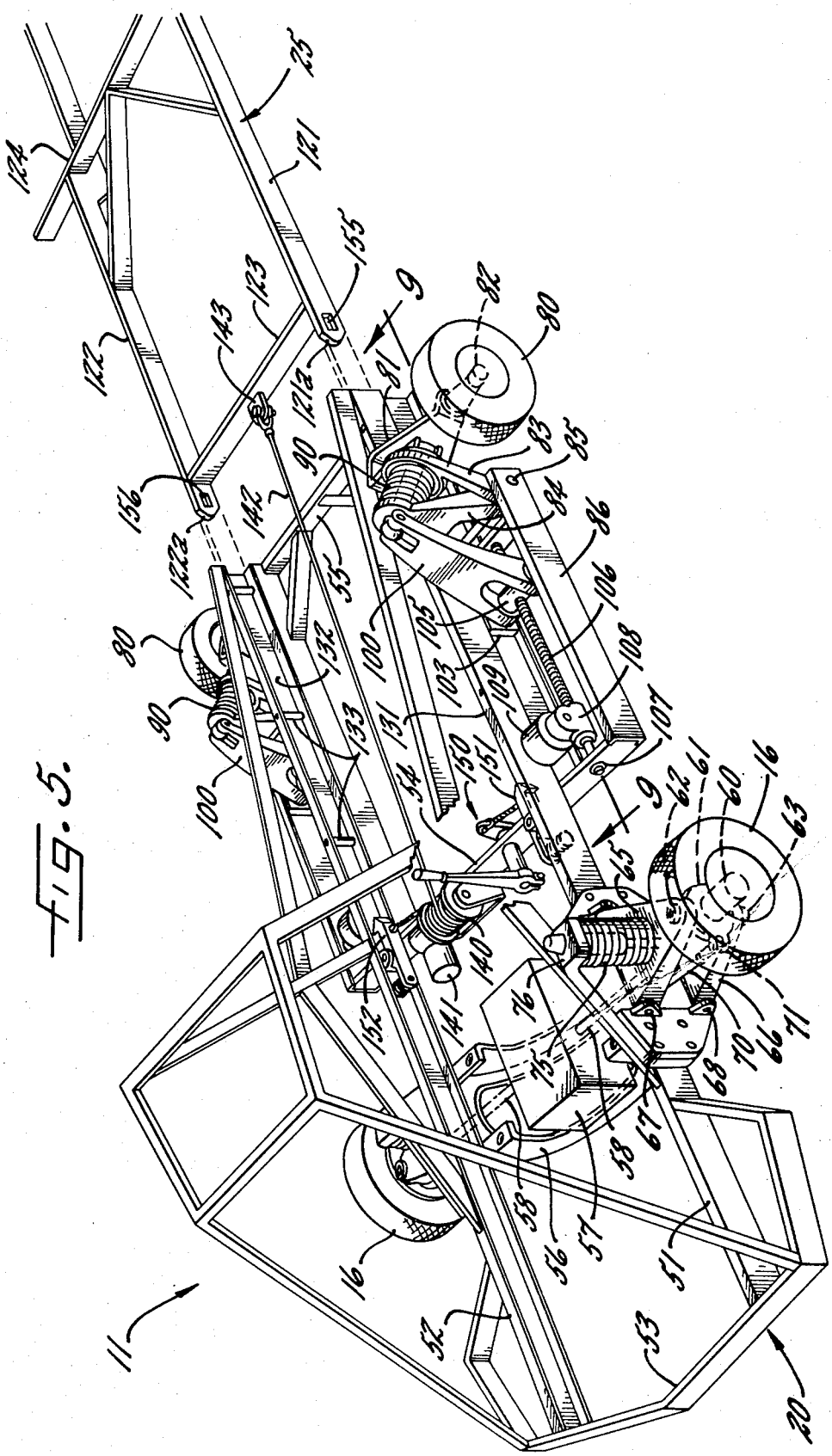

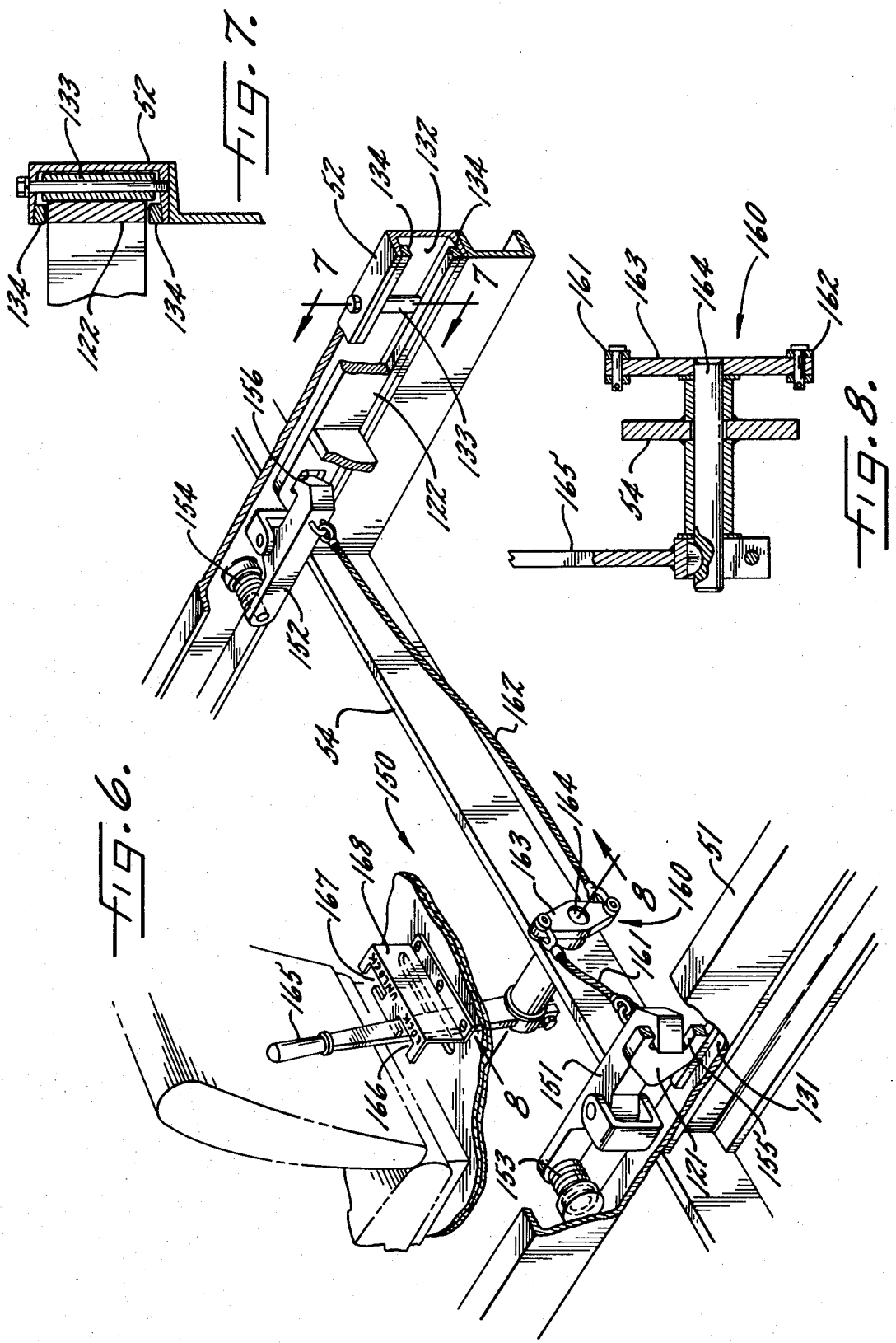

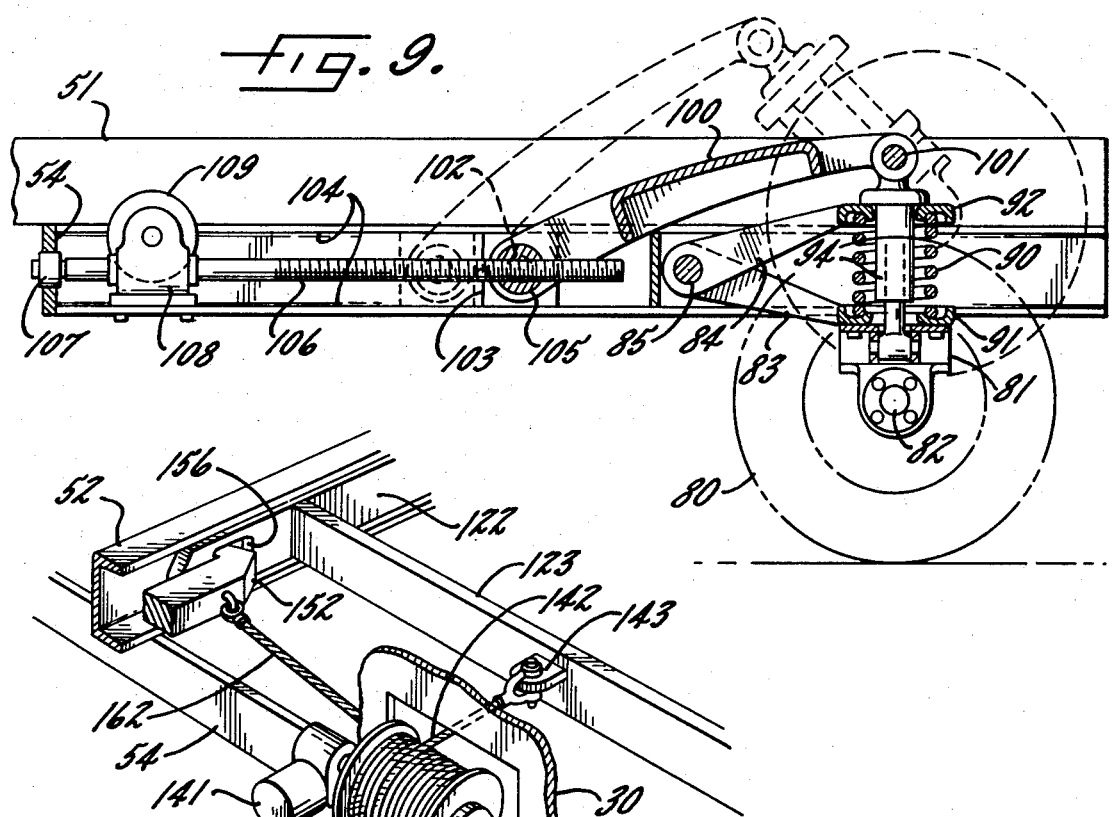
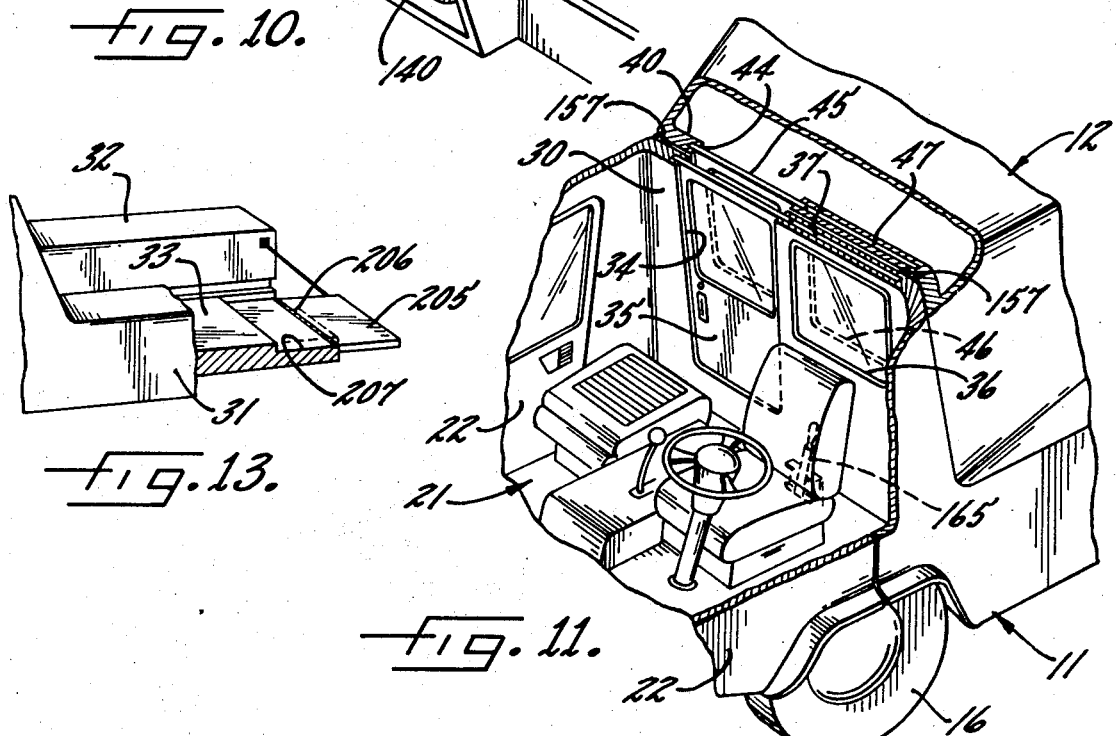

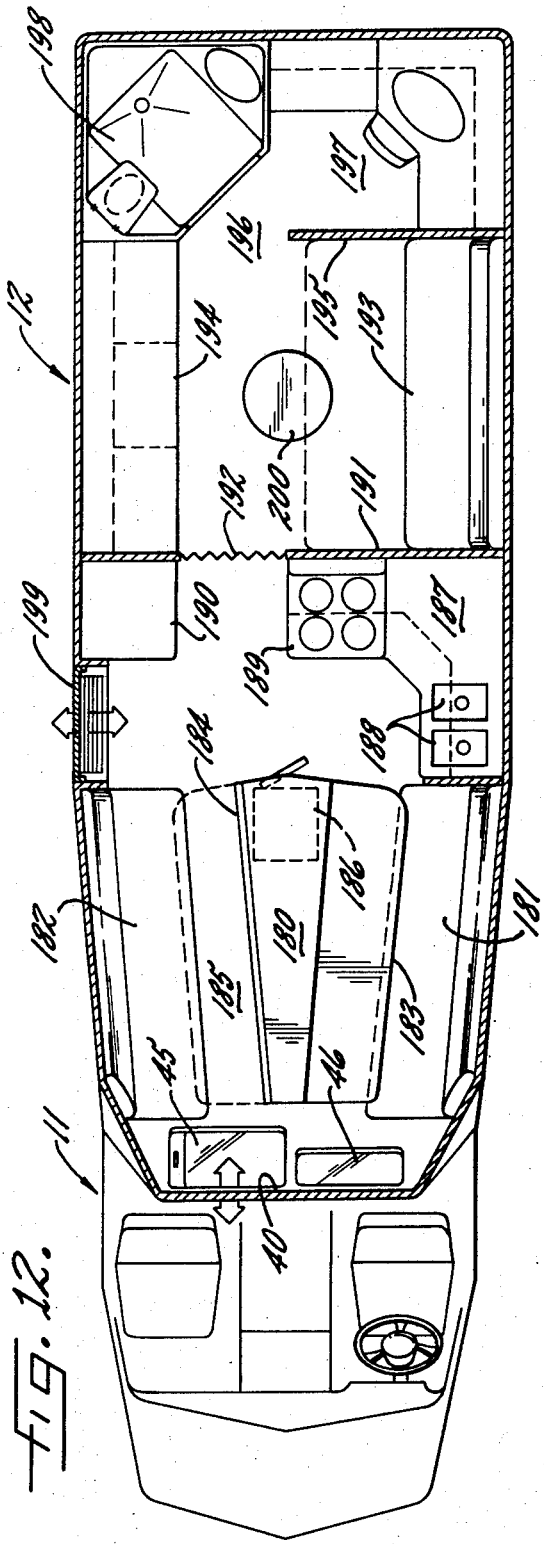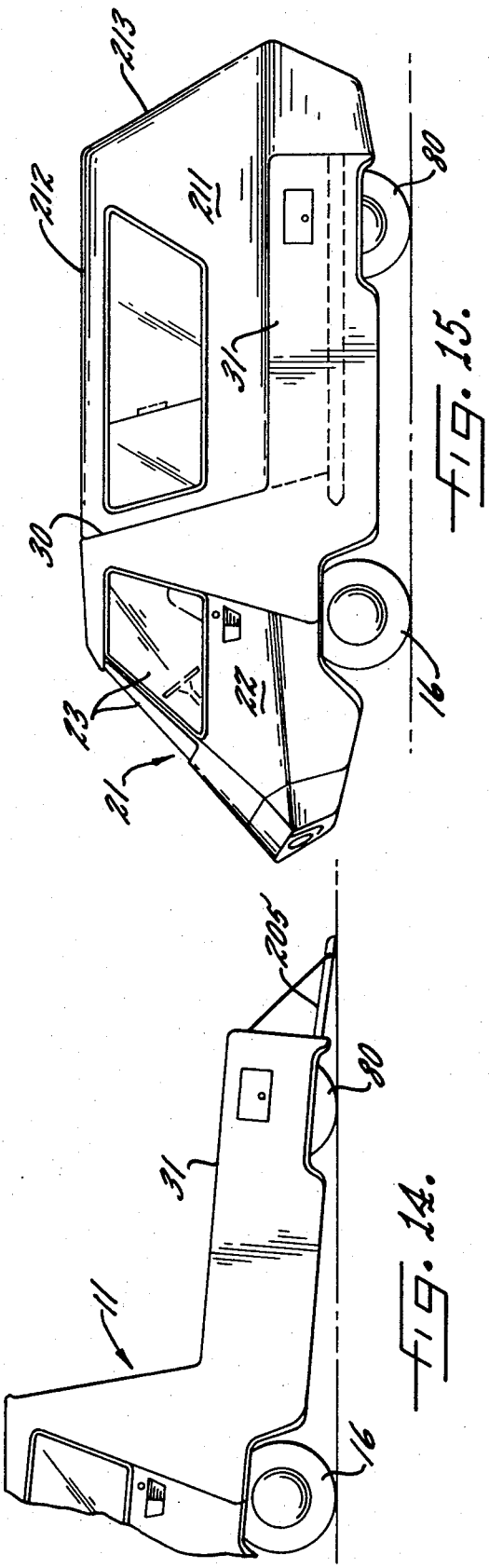

RECREATIONAL VEHICLE

Recreational vehicles intended for travel and camping have generally fallen into one of three categories. First there is the travel trailer which is intended to be towed by a hitch, and with the trailer being isolated from the towing vehicle and not occupied during highway travel. Towing of a trailer is inherently risky and a high degree of driving skill is called for particularly when backing up in cramped quarters.

A second type of recreational vehicle which enjoys a good deal of popularity is the "camper coach" in which a boxy enclosure is supported upon a pickup truck. The resulting structure is limited in size since it cannot extend appreciably beyond the bed of the truck, is inherently top heavy, provides no access to the vehicle cab and is difficult to separate, and support, when a camp site is reached. These problems have lead to the use of single unit recreational vehicles of the "truck-chassis" type having a unitary body and extended truck frame. Such vehicles are not only heavy and expensive but provide no independent runabout capability.

It is an object of the present invention to provide a two-part recreational vehicle having a tractor or "power unit" integrated in a novel fashion with a spacious "living unit∞ for easy driving and safe travel at highway speeds but with the power unit easily and quickly separable, being provided with a pair of auxiliary extendible and retractable rear wheels to enable its use as a runabout when the living unit is parked in a desired location. It is a more detailed object to provide a power unit having rear side rails and a central bed which cooperates with a self-supporting unit having a body which is laterally recessed for nested reception of the side rails and with a horizontally slidable connection between the two units to provide a high degree of strength and rigidity combined with a flush joint at the interface, thereby giving the appearance of unitary construction. It is another detailed object to provide a combinable power unit and living unit in which coupling is effected by direct slidable connection between the main frames of the two units, conveniently referred to as a "telescoping" or "dovetail-type" joint.

It is another object, related to the foregoing, to provide a power unit in which the rear wheels are retractable into the side rails when the units are joined to complete the illusion of unitary construction yet which are readily extendible when it is desired to use the power unit in a four-wheeled mode, as a runabout for local transport of the passengers, as a pickup truck, or for other independent recreational use.

It is another object to provide a composite recreational vehicle in which the power unit and living unit are combined to form a single integrated vehicle with back and forth passage between the units, which handles well at highway speeds, and which has a exceptionally low profile and center of gravity and a weight which is substantially less than single-unit vehicles of comparable size utilizing a truck-type chassis.

It is yet another object to provide a recreational vehicle including a living unit which provides spacious living quarters and a power unit having a cab of much smaller size, proportioned to the size of the power unit to provide a power unit of attractive, balance appearance which is independently usable for many purposes giving no hint of its tractive function, the units being so interfaced that their surfaces join together smoothly and continuously to provide a pleasing unitary appearance and good aerodynamic characteristics in addition to structural integrity.

It is another object of the invention to provide a recreational vehicle having a power unit and living unit in which the living unit is centrally self-supported on tandem wheels so as to exert relatively little downward loading upon the power unit when the units are coupled together and so as to require a minimum of auxiliary bracing when the living unit is standing alone.

It is a general object of the present invention to provide a recreational vehicle which overcomes the drawbacks of vehicles of conventional design, which, indeed, meets all of the requirements of safety and utility which might be demanded of a vehicle in this category but which may be made of light weight construction, simply and at a cost which is substantially less than vehicles conventionally available in combination.

Other objects and advantages of the invention will become apparent upon reading the attached detailed description and upon reference to the drawings in which:

FIG. 1 is a perspective view of a vehicle constructed in accordance with the invention and integrated for highway travel and with the auxiliary wheels retracted.

FIG. 2 is a perspective view showing separation of the power unit from the living unit with the wheels of the power unit extended to enable independent usage as a pickup or runabout.

FIG. 3 is a rear elevational view of the power unit.

FIG. 4 is a front elevational view of the living unit.

FIG. 5 is a perspective view, with parts broken away, showing the structural details of the power unit and coupling means.

FIG. 6 is a fragmentary perspective showing the latching arrangement.

FIG. 7 is a fragmentary section looking along the line 7—7 in FIG. 6.

FIG. 8 is a fragmentary section looking along the line 8—8 in FIG. 6.

FIG. 9 is a fragmentary elevational view showing the means for retracting and extending the rear wheels of the power unit and looking along the line 9—9 in FIG. 5.

FIG. 10 is a fragmentary perspective of the winch forming a part of the power unit.

FIG. 11 is a fragmentary perspective showing the interfacing between the power unit and living units including the provision for back and forth passage.

FIG. 12 is a plan view showing a typical layout of the living unit.

FIG. 13 is a fragmentary perspective showing recessing of the tail gate.

FIG. 14 shows the rear portion of the power unit used for pickup with retrieval directly from ground level.

FIG. 15 shows the power unit independent from the living unit and fitted as a station wagon for transport of passengers.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning now to FIG. 1 there is disclosed an integrated recreational vehicle 10 consisting of a power unit, or tractor, 11 and a wheeled living unit 12. The two units, in addition to being closely coupled, have a substantially flush, smoothly merging, joint between them as indicated by the lines 13,14,15. During highway travel the combined vehicle is supported upon a pair of front wheels 16 and tandem pairs of rear wheels 17. The power unit has a frame 20 (see FIG. 5) mounting a cab 21 equipped with side doors 22 and front and side windows 23, while the living unit has a frame 25 mounting a main body 26 fitted with windows which provide both forward and side vision.

In accordance with the present invention the power unit 11 has, extending rearwardly from the back surface of the cab, a pair of hollow rectangular side rails which define between them a central bed or receiving space, the body of the living unit having, formed in its front end, a pair of horizontal recesses defining a recessed portion between them, the recesses being dimensioned to nestingly receive the rails of the power unit so that, during tansport, the recessed portion of the living unit is received in the bed, with the rear wall of the cab and the front wall of the living unit closely adjacent one another and with registering doorways formed in the walls for convenient back and forth passage during highway travel. Further in accordance with the invention the front wheels 16 of the power unit are both steerable and power driven, while at the rear end of the power unit a pair of auxiliary wheels are provided which are idly rotatable and which may be either retracted into the power unit when the vehicle is assembled as in FIG. 1 or extended into ground engagement to permit separate use of the power unit as a runabout or for pickup purposes as shown in FIG. 2.

More specifically, the cab of the power unit has a rear wall 30 with a pair of rearwardly extending, hollow side rails 31,32 which define between them a bed 33. Formed in the rear wall 30 is a door opening 34 having a sliding door 35 incorporating a window and with a second window 36 adjacent the door opening. The living unit, for its part, has a cooperating front wall 40 bounded by rectangular recesses 41,42 defining a recessed portion 43. The wall 40 has an access opening 44 which is closed by a sliding, windowed door 45 with an adjacent window 46, the door opening 44 and window 46 being positioned to register with the door opening 34 and window 36 in the back wall of a cab. Thus when the two units are assembled, as shown in FIG. 11, with the walls 30,40 seated together, movement of the sliding doors 35, 45 into respective recesses 37,47 creates an opening which permits the passengers to walk back and forth at will between the two units. The registering windows 36, 46 give the driver a clear view of the interior of the living unit. Suitable curtains may be provided for preventing passage of light through the registering windows and door openings under night time driving conditions.

While the details of the power unit may vary over rather wide limits, with many of the options being a matter of choice on the part of the designer, a typical construction may be understood by reference to FIG. 5. As here shown the frame 20 of the power unit includes main longitudinal members 51,52 of channel shape, with cross members 53,54,55 and bridged by a cradle-shaped engine mount 56 which supports an "engine package" 57. The latter, shown only in diagrammatic form, will be understood to include the engine, clutch, transmission and differential, with drive shaft connections 58, diagrammatically shown, leading to the front drive wheels 16. Referring to the "near" one of the front wheels shown in FIG. 5, it is supported upon a shaft 60 which is journaled in a steerable mount 61 secured between a pair of vertical pivots 62,63 and supported, for vertical movement upon a parallelogram linkage. The latter is made up of parallel upper and lower arms 65,66 which are articulated for vertical swinging movement about axes 67,68. Vertically oriented bearings are provided at the outer ends of the arms for engaging the pivots 62,63 to permit turning of the wheel 16 to right or left. The wheel is steered by a tie rod 70 which is pinned, at 71, to the wheel mount 61, the rod 70 being appropriately coupled to the vehicle steering wheel, a matter well within the skill of the art. The parallelogram linkage is downwardly sprung by means of a coil spring 75 which is seated at its upper end upon a bracket 76 which is secured to the frame member 51 of the vehicle, the spring bearing, at its lower end, against the arm 65 which forms the upper element of the parallelogram. The shaft 60, upon which the wheel 16 is mounted, is coupled to the drive shaft 58 through a suitable universal joint (not shown) to permit the wheel to perform both the driving and steering functions characteristic of a so-called "front wheel drive". Corresponding mounting, steering, and driving elements are provided for the wheel 16 located on the opposite side of the vehicle.

For the purpose of supporting the rear end of the power unit when it is used alone, while permitting retraction when the power and living units are coupled together, a pair of freely rotatable auxiliary wheels 80 are provided mounted upon vertically swingable, and manually positionable brackets, with the wheels and their accompanying supporting structure being alined with, and retractable into, the respective hollow side rails 31,32. Thus referring to FIGS. 5 and 9, a rear wheel 80, on the near side of the vehicle, is shown mounted upon a bracket 81 having a spindle 82. The bracket is secured to the lower one of the pair of wishbone arms 83,84 which extend generally fore-and-aft and which are mounted for swinging movement about a transverse shaft 85. The shaft is supported at its inner end upon the longitudinal frame member 51 and at its outer end upon a longitudinally extending support member or bracket 86. To provide springing for the wheel 80 when it is in contact with the ground, a coil spring 90, seated in members 91,92 is interposed between the arms 83, 84. Centered within the coil spring is a shock absorber 94.

In order to hold the wheel 80 in its extended position while permitting retraction to an idle position, a positioning link 100 is provided having a pin 101 at its rear end for effectively coupling it to the upper arm 84 and having a pin 102 at its forward end which is positionable fore-and-aft. For convenience the pin 101 may be connected to the upper end of the shock absorber as shown in FIG. 9. The pin 102 at the forward end of the positioning arm is coupled to a pair of slide blocks 103 which are mounted in parallel ways 104. Interposed between the slide blocks is a traveling nut 105 which is engaged by a longitudinally extending screw 106. The screw is held axially captive in a collar connection 107 but is rotatable by a jack 108 driven by a motor 109.

It will be apparent, then, that when the screw is rotated to propel the nut 105 into the position shown in FIG. 9, the wheel 80 is swung downwardly into engagement with the ground. With the upper arm 84 held in position by the positioning link 100, to form a fixed seat for the spring 90, the wheel is free to swing on arm 83, upwardly about the pivot pin 85, to compress the spring and shock absorber in response to road irregularities. When it is desired to retract the wheel, the motor 109 is operated so that the screw 106 propels the nut 105 forwardly, drawing the link 100 forwardly into the dotted position shown in FIG. 9 accompanied by upward swinging of the arms 83, 84 and retraction of the wheel into a position recessed within the side rail 31. There is sufficient headroom within the hollow side rails so as to accommodate the entire wheel controlling assembly including the arms 83, 84 and positioning link 100.

It will be understood that corresponding structure is provided at the other side of the vehicle as designated by corresponding reference numerals, the other wheel 80, and its associated mechanism, being extendible, and yet upwardly retractable into the side rail 32. Conveniently, a control panel may be provided at 110 for operating the switches which control the motor 109 and for operating the power winch to be discussed.

In accordance with one of the aspects of the invention, longitudinal slides and receptacles are interposed between the power unit and living unit, with power operated means in the form of a winch for drawing the slides into the receptacles to a forwardly bottomed position providing a joint of the telescoping or dovetail type for mutual rigidification of the power unit and living unit. More specifically in accordance with the invention, the slides are in the form of exposed longitudinal frame elements forming a portion of the frame of the living unit and occupying the recesses at the side of the living unit to face in mutually opposite directions. The receptacles, which receive the slides, are formed by the exposed inwardly facing channels 51,52 which constituted the main longitudinal frame members of the power unit, such channels being faced inwardly along the respective side rails 31,32. Thus, referring to FIG. 5 the slides, indicated at 121,122 comprise main longitudinal elements of the frame 25 of the living unit, being bridged at the forward end by a cross member 123 and at the rear end by an extended cross member 124. The receptacles for receiving the slides, and which are indicated at 131,132 are formed by longitudinal pockets inside of the channel members 51, 52 form the backbone of the power unit. Lubricated guide rollers 133 which line the receptacles, as well as anti-friction pads 134 (FIG. 7), help to insure that the slides 121,122 are smoothly guided into and out of seated position.

For the purpose of drawing the two units together, a power winch 140 is mounted upon the frame of the power unit driven by an electric motor 141 and having a cable 142 connectable to a hitch point 143 mounted at the center of the frame member 123 on the living unit. The tips of the slides are preferably rounded as indicated at 121a,122a to facilitate entry even though the slides and receptacles may not be in precise vertical alinement.

In carrying out the invention secure means are provided for latching the slides in their forwardly seated positions. As shown in FIG. 6, the latching mechanism, generally indicated at 150, includes pivoted latches 151,152 having biasing springs 153,154 respectively. The tips of the latches are received in registering openings or eyes 155,156 in the forward ends of the slides. The winch is energized until the latches snap into place.

After telescoping together, the exposed portions of main frame members 51,52 of the power unit and the frame members 121,122 of the living unit are in securely dovetailed, overlapping relation so that the frames of the two vehicles become integrated into a single rigid unit of great structural strength, just as though the frames of the power and living units had been initially constructed, by welding or the like, into a single unit.

The total vehicle is highly stable and easily driven at highway speeds for a number of different reasons: It is structurally tight. The living unit is largely balanced over its own wheels imposing a net load downwardly upon the power unit at its forward end but a load which is, percentagewise, quite light. The profile is low; the center of gravity of the assembly is extremely low, and the total weight may be substantially less than the single unit vehicle with a truck type chassis.

It is one of the features of the construction that the rear wall 30 of the cab and the front wall 40 of the body of the living unit not only conform in profile to one another but each has a precise orientation with respect to the axes of the receptacles 131,132 and the slides 121,122, respectively, which engage them. Because of the straight telescoping, or dovetailed, engagement, the walls 30, 40, respectively, are drawn together conformingly and "flatly" over the entire presented area. This insures that any gasket which is interposed between the surfaces to effect water tightness is contacted with substantially equal pressure throughout its entire length. In the present instance sealing is effected by a gasket 157 of resilient material which is secured adjacent the edge of, and substantially surrounding, the front wall 40 of the living unit (FIG. 4).

For releasing the latches to separate the two units, a release mechanism 160 is employed including cables 161, 162 (see FIGS. 6 and 8) which are connected to a crank member 163 mounted upon a shaft 164 operated by a manual control lever 165. The latter is held in its locking and unlocking states within respective recesses 166,167 formed in a bracket 168.

In carrying out the present invention the cross sectional area of the living unit substantially exceeds the cross sectional area of the cab on the power unit, yet the two are smoothly merged together by providing convergent surfaces at the front end of the living unit, surfaces which are preferably faceted to provide an interface of trapezoidal cross section between the rear surface 30 of the cab and the front surface 30 of the living unit. The relative cross sections may be noted by comparing the profile of FIG. 4 with that shown in FIG. 3. Referring to FIGS. 1 and 2, the roof 170 of the living unit has a sloped facet 171 which merges smoothly, along line 13, with the roof 172 of the cab. The side of the living unit, indicated at 173, is angled inwardly to form a facet 174 which merges smoothly with the cab along line 14. Finally, the side 173 of the living unit is sloped inwardly along a downwardly-facing facet 175 to merge smoothly with the outside surface of the side rail 31 on the power unit along line 15. This not only enhances the appearance of the combined vehicle but it permits a maximum of volumetric space within the living unit while employing a cab of normal passenger car width thereby avoiding the usual bulky appearance characteristic of the cabs of unitary "truck chassis" vehicles. The combination, in addition to being pleasing to the eye, is aerodynamically efficient. Moreover, the cab size is more nearly proportioned to the size of the power unit when the latter is used alone, thus enhancing its value as an independent vehicle.

It is one of the features off the construction that the forwardly facing facets 171, 174 are at least partially occupied by windows so that the passengers in the living unit are able to look forwardly down the road as well as to the side. Thus, the facts 171,174 have a window 176 which is of bent or wrap-around construction occupying portions of both of the facets. Immediately behind the window 176 is a window 177 which is also of bent construction, occupying portions of the roof 170 and side 173. Similar, but smaller, windows 178 are provided toward the rear of the living unit. The window pattern is repeated on the opposite side of the vehicle.

While the invention is not limited to any particular layout of accommodations in the living unit, typical accommodations are shown in plan view in FIG. 12. Here it will be noted that the forward portion of the living unit is occupied by a narrow central console 180 flanket by elongated seats 181,182 respectively, which may be employed for normal seating, for sleeping, and for dining purposes. The central console 180 has drop leaves 183,184 which, when raised, form a table of substantial size and which when lowered provide a passageway 185 leading to the cab. A refrigerator 186 may, if desired, be mounted in the console.

Directly to the rear of the seat 181 is a counter 187 providing sinks 188 and merging with the top of a range 189. Opposite the range is a heating furnace 190. The rear portion of the living unit, defined by a transverse wall 191, having a door opening 192, is occupied by an elongated seat 193 which may be converted to a double bed. Arranged opposite the seat are storage facilities in the form of cabinets 194 having various built-ins such as audio and TV equipment. At the rear of the living unit is a further transverse wall 195 having a doorway 196 leading to a dressing room or vanitory 197. The rear right-hand corner of the structure is occupied by a shower basin and toilet assembly 198. Exit doors are located conveniently as, for example, at the position 199. Auxiliary furniture may be provided such as the coffee table 200 in the rear compartment. It will be apparent that the space is large enough to include all of the desired amenities while preserving an attractive, "sleek" appearance when viewed from the outside.

Upon arriving at a temporary destination, auxiliary supporting legs such as indicated at 201 in FIG. 2, may be extended into contact with the ground. The generally central position of the wheels 17 of the living unit, and the fact that such wheels are provided in tandem, means that the living unit is capable of self-support and only light auxiliary bracing need be provided by the supporting legs. The rear wheels of the power unit may be lowered into contact with the ground and, when the latch mechanism 150 is released, the power unit may simply be driven away.

The power unit may be employed for runabout purposes or used as a conventional pickup truck. For the latter purpose the power unit may be provided with a tail gate 205 having a hinge 206 for connecting its lower edge to the rear of the bed and forwardly swingable so that, when the two units are fitted together, the tail gate occupies a shallow, conforming recess 207 in the bed 33 (see FIGS. 3 and 13).

When the power unit is employed in the manner of a pickup truck, loading and unloading is facilitated by the fact that the rear wheels 16 are retractable, thereby lowering the rear end of the power unit to a position adjacent the ground, and with the remote edge of the tail gate resting upon the ground to form an inclined ramp as shown in FIG. 14. Where it is desired to increase the passenger capacity of the power unit, so as to accommodate all of the passengers of the combined vehicle, the rear portion of the power unit may be easily fitted with side walls 211, a roof 212 and a rear wall 213 to convert the power unit into a "station wagon" (FIG. 15), seating being provided on the longitudinally extending side rails 31,32, suitably cushioned. In such event access to the rear portion of the power unit may be provided through the doorway 34. The structure which forms the side walls and roof of the "station wagon" may be stored within an externally accessible compartment in the living unit so as to be readily available for making the conversion when the living unit is to be parked.

While the power unit has particular utility as the tractor portion of a composite living vehicle, it will be apparent that the power unit may be flexibly used for a number of different purposes. The rear portion thereof may be provided with a sporty canvas top (in lieu of "station wagon" treatment) or the power unit may be used for total support of a "camper coach", where only a limited number of people are to be transported and where all of the facilities, and size, of the living unit are not required. Or, if desired, the power unit may be provided with side and top walls to serve as a covered van. It will be apparent, too, that the power unit may be equipped with usual ball-type hitch to pull a boat trailer or other type of trailer. Because of the pleasing proportions and utility of the power unit when used alone, particularly with a totally supported camper, the power unit may be made the subject of an initial purchase and used in various ways until such time as the owner desires to add the living unit to make up a fully integrated travel vehicle. The front wheel suspension, or springing, may be switchable between two conditions so as to provide lighter springing when the power unit is used alone and stiffer springing when the power unit is rigidly coupled to the living unit as required to support some of the weight of the latter. Conventionally available "load compensating" shock absorbers of the pneumatic type may, if desired, be employed for this purpose.

The term "dove-tail type connection" refers to a connection in which the two parts are slideably guided along a path to a final seated position to thereafter resist relative twisting movement at the joint.

I claim as my invention:

1. In a recreational vehicle assembly the combination comprising a power unit in the form of a tractor vehicle having a frame mounting a body and having pairs of front and rear wheels, the front wheels having means for driving and steering the same, the rear wheels being freely rotatable and mounted for vertical positioning relative to the frame, the body having a cab at the front and a pair of horizontal side rails at the back, the side rails being spaced parallel to one another and defining a horizontal bed between them, a living unit having a frame mounting a main body and having centrally located supporting wheels, the main body having horizontal recesses formed in its front end and extending along the sides of the body to define a recessed portion, means for axially drawing together the power unit and the living unit, means providing a horizontally slidable connection between the power unit and the living unit associated with the side rails and recesses respectively so that as the units are drawn together the side rails are restingly fitted in the recesses to provide a substantially flush joint with the recessed portion resting in the bed, the cab having a rear wall and the main body having a conforming front wall, the walls being so oriented with respect to the slidable connection that they mate closely face-to-face when the units are drawn together, the walls having registering doorways and having individual doors simultaneously openable to provide passage when the units are drawn together and individually closable for security when the units are separated from one another.

2. In a recreational vehicle assembly the combination comprising a power unit in the form of a tractor vehicle having a frame mounting a body and having pairs of front and rear wheels, the front wheels having means for driving and steering the same, the rear wheels being freely rotatable and mounted for vertical positioning relative to the frame, the body having a cab at the front and a pair of hollow rectangular side rails at the back, the side rails being spaced parallel to one another and defining a horizontal bed between them, a living unit having a frame mounting a main body and having centrally located supporting wheels, the trailer body having rectangular recesses formed in its front end and extending along the sides of the body for registering with the side rails, means for axially drawing together the power unit and the living unit, means providing a horizontally slidable connection of the dovetail type between the power unit and the living unit associated with the side rails and recesses respectively so that as the units are drawn together the side rails are fitted in the recesses to provide a substantially flush joint between them, the cab having a back wall and the main body having a conforming front wall, the walls being so oriented with respect to the slidable connection that they mate closely face-to-face when the units are drawn together, the walls having registering doorways, and means for moving the rear wheels of the power unit downwardly into an extended position when the units are separate and for moving the rear wheels to an upwardly retracted position when the units are drawn together.

3. The combination as claimed in claim 2 in which the rear wheels of the tractor vehicle are vertically alined with the side rails thereof and are retractable upwardly into the side rails.

4. The combination as claimed in claim 3 in which the means for extending and retracting the rear wheels is housed in the side rails ahead of the rear wheels.

5. The combination as claimed in claim 3 in which the mounting means for each rear wheel includes a positioning link extending fore-and-aft coupled to the wheel at its rear end and having adjustable means for coupling to the frame at its forward end for adjusting the angular position of the link.

6. The combination as claimed in claim 5 in which the adjusting means includes a power driven screw having a nut traveling thereon, the nut being secured to the forward end of the link.

7. The combination as claimed in claim 2 in which the rear wall of the cab and the front wall of the living unit are of matching trapezoidal profile both angled forwardly to the same degree with respect to the slidable connection between the units.

8. The combination as claimed in claim 2 in which the means for axially drawing together the power unit and the living unit is in the form of a power driven winch located at the front of the bed and having a cable connected to the living unit.

9. The combination as claimed in claim 2 in which the horizontal slidable connection is in the form of a pair of longitudinal slides on one of the units and means providing a pair of registering longitudinal recesses on the other unit.

10. The combination as claimed in claim 9 in which a latch mechanism is provided in the power unit for latching the longitudinal slides in their forwardly seated positions.

11. The combination as claimed in claim 2 in which the horizontal slidable connection is in the form of longitudinal slides on opposite sides of the recessed portion of the living unit and facing outwardly therefrom and registering inwardly facing receptacles on the side rails of the power unit together with manually controlled means for maintaining the slides securely seated in the receptacles.

12. In a recreational vehicle assembly the combination comprising a power unit in the form of a tractor vehicle having a frame mounting a body and having pairs of front and rear wheels, the front wheels having means for driving and steering the same, the rear wheels being freely rotatable and mounted for vertical positioning relative to the frame, the body having a cab at the front and a pair of horizontal side rails at the back, the side rails being spaced parallel to one another and defining a horizontal bed between them, a living unit having a frame mounting a main body and having centrally located supporting wheels, the main body having horizontal recesses formed in its front end and extending along the sides of the body to define a recessed portion, means for axially drawing together the power unit and living unit, means providing a longitudinally extending dovetail-type connection between the side rails of the tractor vehicle and the recessed portion of the main body, the cab having a rear wall and the main body having a conforming front wall, the side rails being dimensioned to fit into the recesses in the main body and the recessed portion being dimensioned to fit in the bed so that when the units are drawn together the rear wall of the cab mates face-to-face with the front wall of the main body, the walls having registering doorways to provide back and forth passage when the units are drawn together, the mating walls of the cab and trailer body being of trapezoidal profile, the main body being both higher and wider than the cab and having a front portion which is tapered inwardly and downwardly to provide a smoothly merging joint between the two units.

13. In a recreational vehicle assembly the combination comprising a power unit in the form of a tractor vehicle having a frame mounting a body and having pairs of front and rear wheels, the front wheels having means for driving and steering the same, the rear wheels being freely rotatable and mounted for vertical positioning relative to the frame, the body having a cab at the front and a pair of horizontal side rails at the back, the side rails being spaced parallel to one another and defining a horizontal bed between them, a living unit having a frame mounting a main body and having centrally located supporting wheels, the main body having horizontal recesses formed in its front end and extending along the sides of the body to define a recessed portion, means for axially drawing together the power unit and the living unit so that the side rails are fitted in the recesses, the frame of the power unit including main longitudinal frame members exposed and extending along the respective inside surfaces of the side rail, the frame of the living unit including main longitudinal frame members exposed and extending along the side surfaces of the recessed portion, the exposed portion of the longitudinal frame members being constructed and arranged for mutual telescoping engagement as the units are drawn horizontally together, and means for securing the frame members in their fully telescoped relation so that the frames of the power and living units are rigidly integrated with one another.

14. The combination as claimed in claim 13 in which the exposed frame members of the living unit are in the form of parallel slides and in which the exposed frame members of the power unit are in the form of parallel inwardly facing channels for telescopingly receiving the slides.

15. In a recreational vehicle assembly the combination comprising a power unit in the form of a tractor vehicle having a frame mounting a body and having pairs of front and rear wheels, the rear wheels having means for vertical positioning relative to the frame, the body having a forward cab with a rearwardly facing wall and an adjacent horizontally extending bed at the back, a living unit having a frame mounting a main body and having centrally located supporting wheels, the main body having a front wall which conforms to the rear wall of a cab and having an adjacent front portion which is dimensioned to be received in the bed, the frame of the power unit including longitudinal frame members exposed and extending along the bed, the frame of the living unit including longitudinal frame members exposed and extending along the front portion, the exposed portions of the respective frame members being dimensioned and arranged for mutual telescoping engagement as the units are drawn horizontally together, and means for securing the frame members in their fully telescoped relation so that the frames of the power and living units are rigidly integrated with one another and so that the walls of the cab and living unit seat closely face-to-face, the walls having registering doorways for passage back and forth between the units.

16. In a recreational vehicle assembly, the combination comprising a power unit in the form of a tractor vehicle having a frame mounting a body and having pairs of front and rear wheels, the front wheels having means for driving and steering the same, the rear wheels being freely rotatable and mounted for vertical positioning relative to the frame, the body having a cab at the front and a pair of horizontal side rails at the back, the side rails being spaced parallel to one another having inside surfaces defining a horizontal bed as well as outside surfaces, a living unit having a frame mounting a main body and having centrally located supporting wheels, the main body having horizontal recesses formed in its front end and extending along the sides of the body to define a recessed portion, the recessed portion being dimensioned to fit into the bed of the power unit while the side rails are received in the horizontal recesses, the living unit having vertical and horizontal dimensions which are substantially greater than the cab on the power unit, the roof of the living unit having a downwardly sloping surface at its forward end to merge smoothly with the roof of the cab, the side walls of the living unit having inwardly convergent surfaces merging with the side walls of the cab and with the outside surfaces of the side rails thereby to provide a smoothly fitted joint between the power unit and the living unit notwithstanding the differences in cross section thereof.

17. The combination as claimed in claim 16 in which the sloping and convergent surfaces at the front end of the living unit are at least partially occupied by windows for direct forward viewing by the passengers in the living unit.

18. In a recreational vehicle assembly the combination comprising a power unit in the form of a tractor vehicle having a frame mounting a body which includes a cab at the front and a receiving space including a longitudinal bed at the back, a pair of front wheels having means for driving and steering the same, a pair of rear wheels freely rotatable and mounted for vertical positioning relative to the frame, the cab having a generally flat rear wall surface including a door opening, a living unit having a frame mounting a main body and centrally located supporting wheels, the main body having a front wall conforming in profile and orientation to the rear wall of the cab and having a door opening registering with the door opening in the latter, gasket means interposed between the walls and generally following the wall periphery, means for drawing together the power unit and the living unit, and means providing a dovetail-type horizontally slidable connection between the frames of the power and living units for securing a rigid joint between them and for maintaining the units in predetermined orientation with respect to one another as they are drawn together for flat and continuous seating of the gasket with respect to the wall surfaces.

19. In a recreational vehicle assembly the combination comprising a power unit in the form of a tractor vehicle having a frame mounting a body and having pairs of front and rear wheels, the front wheels having means for driving and steering the same, the rear wheels being freely rotatable and mounted for vertical positioning relative to the frame, the body having a cab at the front and a pair of horizontal side rails at the back, the side rails being spaced parallel to one another and defining a horizontal bed between them, a tail gate hinged at its lower edge along the rear edge of the bed for bridging the space between the side rails, a living unit having a frame mounting a main body and having centrally located supporting wheels, the main body having horizontal recesses formed in its front end and extending along the sides of the body to define a recessed portion, means for axially drawing together the power unit and the living unit, means providing a horizontally slidable connection between the units so that as the units are drawn together the side rails are nestingly received in the recesses with the recessed portion of the main body received in the bed, the tail gate being forwardly swingable about its hinge so that when the units are assembled the tailgate lies between the recessed portion of the body and the bed.

20. The combination as claimed in claim 19 in which the bed of the power unit has a shallow flat-bottomed recess adjacent the tail gate of a depth which is substantially equal to the thickness of the tail gate for conformingly receiving the tail gate when it is in its forwardly swung position.

21. In a recreational vehicle assembly the combination comprising a power unit in the form of a tractor vehicle having a frame mounting a body which includes a cab at the front and a receiving space including a longitudinal bed at the back, the power unit having a pair of front wheels having means for driving and steering the same and a pair of freely rotatable rear wheels, the cab having a rear wall with a door opening, a living unit having a frame mounting a main body and centrally located supporting wheels, the main body having a cooperating front wall conforming in profile and orientation to the rear wall of the cab and having a registering door opening, means providing a dovetail-type horizontally slidable connection between the frames of the power and living units, means for securing the units together in assembled relation with the cooperating walls face-to-face to form a rigid joint between them, the rear wheels of the power unit being retractable with respect to the frame of the power unit when the units are assembled together and being extendible into ground engagement for separate usage of the power unit.

22. In a recreational vehicle assembly the combination comprising a power unit in the form of a tractor vehicle having a frame mounting a body which includes a cab at the front and a receiving space including a longitudinal bed at the back, the power unit having a pair of front wheels having means for driving and steering the same and a pair of freely rotatable rear wheels, the cab having a rear wall with a door opening, a living unit having a frame mounting a main body and centrally located supporting wheels, the main body having a cooperating front wall conforming in orientation to the rear wall of the cab and having a registering door opening, means providing a disengageable connection between the frames of the power and living units, means for drawing the units together into assembled relation with the cooperating walls face-to-face to form a rigid joint between them providing a unitary door opening, means for retracting the rear wheels of the power unit with respect to the frame to raise the rear wheels from the ground when the units are assembled together and for extending the rear wheels into ground engagement when the power unit is uncoupled for separate usage, and means for independently closing the respective door openings when the units are separately used.

* * * * *